June 16, 1953    J. DE GIER ET AL    2,642,365
METHOD OF FORMING A SMOOTH SURFACE ON A SUBSTRATUM
Filed July 24, 1947
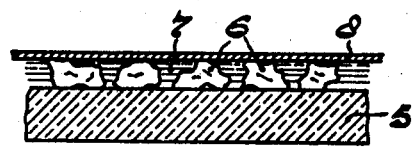
INVENTORS
JAN PEPER
JOHANNES DE GIER
BY
AGENT Patented June 16, 1953

2,642,365

UNITED STATES PATENT OFFICE 2,642,365

METHOD OF FORMING A SMOOTH SURFACE ON A SUBSTRATUM

Johannes de Gier and Jan Peper, Eindhoven, Netherlands, assignors to Hartford National Bank and Trust Company, Hartford, Conn., as trustee Application July 24, 1947, Serial No. 763,243
In the Netherlands July 27, 1946

4 Claims. (Cl. 117—33.5)

This invention relates to a method of applying a thin covering layer to a substratum having an uneven surface. Furthermore the invention relates to luminescent screens manufactured by such a method.

When a thin covering layer of arbitrary material (thickness less than 10 microns) is required to be applied to a substratum having an uneven surface, great difficulties are generally involved in procuring a smooth surface of the covering layer since the material thereof will always penetrate to a greater or smaller extent into the unevennesses of the resultant surface of the substratum. The surface is not smooth enough to be suitable, for example, for applying thereto a reflecting metal layer. Furthermore the surface does not exhibit sufficient smoothness for numerous other uses.

An uneven surface of the substratum is always present when the substratum consists of granular material, when the material of the substratum exhibits porosity, or when its surface exhibits grooves due to working. An example of a granular layer is, for example, the surface of a luminescent screen. Porous material is, for example, ceramic material and surfaces exhibiting grooves due to working are found in metallic substrata which are required to serve for the application of thin reflecting layers in reflectors.

In all these cases it would seem that the above-mentioned disadvantages could be obviated by utilizing film-forming material. However, it has been found that film-forming material does not acquire a smooth surface either. A covering layer of film-forming material, for example nitrocellulose, is described as an intermediate layer with luminescent screens of cathode-ray tubes. On the side adjacent the cathode, the intermediate layer is coated with a reflecting metallic layer for the purpose of obtaining greater brightness of the luminescent image.

It has previously been suggested that a thin, coherent smooth layer of film-forming material should be applied to a substratum having an uneven surface by filling up the unevennesses of the surface with a liquid, by allowing the liquid to solidify by cooling and applying the film-forming layer to the layer thus filled up. Consequently, the film-forming layer is provided on the more or less smooth surface of the solidified filling liquid. Such a method has been used for the manufacture of luminescent screens for cathode-ray tubes in which the side adjacent the cathode is required to be covered with a smooth reflecting metal layer. Materials suitable for use as a solidifying liquid in such a process to fill up the unevennesses are benzol, acetone, and alcohol.

The above-described known method exhibits many disadvantages, nearly all of which are connected with the complicated temperature treatment that is required. Especially if the support for the substratum is of great thickness, as is the case with cathode-ray tubes of large size, the decrease in temperature penetrates slowly from the outside to the inside of the tube. Consequently, the cooling process takes much time. Furthermore for different tubes, the solidification of the filling liquid does not always take place at a fixed moment after the beginning of the cooling due to the unavoidable differences in thickness of the support for the luminescent layer. Consequently, if such a process is desired to be made automatic for mass production, allowance has to be made for the greatest possible thickness of the support and hence for the longest time that may reasonably be expected for solidification.

Furthermore the use of a cooling body and the equipment associated therewith is, of course, expensive and complicated.

A further disadvantage plays an important part when the substratum, as is the case with luminescent screens, consists of granular material adhered to a support in some manner or other, as by means of a binder. Since the coagulated filling liquid will always exhibit a comparatively great hardness and, as a rule, a volume different from that of the liquid itself. Consequently, the grains may be pulled loose from the support upon the change of state of the material. This disadvantage might be reduced by utilising binders of greater strength but in this case the choice of the binder is, of course, more restricted.

Finally, there is the disadvantage that the materials of the substratum are chemically attacked by the filling liquid as a result of the prolonged treatment. It is evident that a filling material is chosen which is such that this attack is as small as possible but it is clear that it is always least with rapid treatment.

In the method according to the invention the above-mentioned disadvantages are experienced to a much smaller extent while furthermore other advantages are obtained.

According to the invention, a thin covering layer is applied to a substratum having an uneven surface by first filling up the unevennesses with a liquid with which the material of the covering layer does not enter into reaction, and then providing the said covering layer on the substratum thus filled up. The filling liquid is removed after the covering layer has been applied.

The fundamental difference with respect to the above-described known method is that, according to the invention, the cooling liquid is not caused to solidify by a cooling treatment. Consequently, instead of being applied to a solid substance, the covering layer is provided on a fluid surface. It is a surprising fact that in this case a smooth, coherent covering layer is ensured and this affords numerous advantages, which are substantially connected with the suppression of the cooling treatment. Thus complicated cooling equipment is not required, the duration of the whole of the process is much shorter, time differences cannot occur, the chemical attack of the material constituting the substratum is much smaller as a result of the shorter duration and furthermore in the case of a granular substratum provided on a support the filling liquid does not exert any force liable to pull the grains from the support. A further particular advantage obtained with the method according to the invention is that the covering layer acquires a smoother surface than that which is generally obtainable with the above-described known method, since liquids which are caused to solidify by cooling always exhibit a more or less rough surface as a result of crystallisation. Taking, for example, a surface of ice, it is well-known that the ice surface exhibits more or less the shape of a mountain so that in this case it is even questionable if a granular substratum permits the attainment of an improvement with respect to the unevenness of the granular surface of the substratum itself.

As mentioned above, the filling liquid must not enter into reaction with the material of the covering layer. The term "react" is to be understood here to mean not only that a chemical reaction might occur between the filling liquid and the covering layer but also that the material of the covering layer must not be liable to mix with the filling liquid or to dissolve therein. Consequently, the term "react" generally refers in this case to both chemical and physical interaction of the material of the covering layer and the filling liquid.

The covering layer may consist of film-forming material. As an example we may mention nitrocellulose dissolved in ethyl acetate or butyl acetate. Such a solution may be poured on the substratum filled up with a liquid, whereupon the solvent is caused to evaporate. The covering layer is formed during this evaporation as a coherent film. Since in this case use is made of a solution, the solvent also is required not to enter into reaction with the filling liquid.

Preferably, neither the filling liquid, nor the material of the covering layer or, as the case may be, its solvent must enter into reaction with the material of the substratum. In some cases a slight reaction will be unavoidable but as a matter of fact such reaction must remain much restricted.

Non-film-forming material which may be used to constitute covering layers are, for example, paraffine and stearine.

In certain cases it may be desirable to add a softening agent to the covering layer in order that the covering layer on being formed may be prevented from cracking or loosening from the substratum. This addition may be necessary more particularly with film-forming covering layers. A very suitable softening agent is, for example, castor oil.

A plurality of substances may be used as a filling liquid. Very suitable is, for example, water, alcohol or benzene. These filling liquids may be removed in a simple manner, viz. by drying in the air. As a rule, use will be made of substances adapted to be readily removed by vaporisation.

If desired, a further layer may be applied to the covering layer, which is of great importance, for example, for cathode-ray tubes. In this case the covering layer may consist of a film of nitrocellulose provided on a luminescent substratum and may, in turn, be covered, for example, with a thin metal layer for the purpose of increasing the brightness of the luminescent image, or with a luminescent layer for the purpose of changing the colour of the luminescent image, obtaining a longer time of luminescence, or the like.

If a further layer is applied to the covering layer, the filling liquid may be removed either immediately after the application of the covering layer or at a later stage, after the further layer has been provided.

As a matter of fact, it is possible to provide a plurality of layers on one another, in which event the method according to the invention may be applied to each succeeding layer. Thus, for example, a luminescent screen is possible which comprises a substratum of luminescent material, a covering layer of nitrocellulose, a second luminescent layer likewise covered with a thin layer of nitrocellulose, and finally a reflecting metal layer applied to the latter covering layer.

The example following hereinafter illustrates a particular use of the method according to the invention in manufacturing cathode-ray tubes.

In the manufacture of such tubes it is frequently necessary that parts of the wall, both in the conical and cylindrical portions, should be provided with a conductive coating consisting of rings. The provision of such rings takes place by filling the whole of the tube with a metal suspension from which a metal layer deposits on the whole wall. Afterwards portions of this layer may be removed so as to leave metal rings.

In some cases it occurs that the wall exhibits grooves on those portions that are required to keep clear from metallisation. Such grooves may arise, for example, due to bubbles produced in moulding the glass, which burst open in drawing the tube. As a matter of fact, during the metallising treatment metal deposits also in the grooves and this deposit of metal is very difficult to remove. Thus, an undesirable short-circuit arises between two or more rings which may lead to highly disadvantageous phenomena in the use of the tube.

To avoid this disadvantage, use may be made of the method according to the invention. The glass parts on which the grooves are expected are coated with a thin smooth covering layer, for example nitrocellulose, by the method according to the invention. Now, the metal from the suspension can deposit on the covering layer but cannot deposit in the grooves. From the covering layer, on account of its smoothness, the metal can be readily removed. If necessary, the covering layer is also removed afterwards.

When the substratum consists of luminescent material it will in many cases be provided in a discharge tube. In this case the whole method according to the invention may be carried out inside the discharge tube.

The invention will now be explained more fully with reference to the accompanying drawing illustrating a stage of the method according to the invention such as may be used in the manufacture of a luminescent screen provided on a glass support and intended for use in a cathode-ray tube.

In the figure reference numeral 5 designates a portion of the glass support exhibiting grains 6 of luminescent material. Between these grains are apertures 7, which are filled with a liquid, for example water. On the layer thus formed is provided a covering layer 8, for example by pouring a solution of nitrocellulose in butyl acetate on to the filled layer 6—7. The solvent is allowed to evaporate therefrom, during which process the layer 8 forms as a film on the luminescent layer. After this covering layer has been formed, the filling liquid is allowed to evaporate. The vapors disappear in part at the sides of the screen and in part through the covering layer 8. This phase of the method according to the invention may be followed by applying to the covering layer 8 a succeeding layer, for example of metal. If desired, after this metal layer has been provided, the covering layer 8 may be removed by heating the whole of the screen to a comparatively high temperature for example 400° C. The removal of such an intermediate layer is known per se. Owing to the fact that the filling liquid has been preliminarily removed, the grains of the luminescent material are separated by the apertures initially present which allow the vapors from the vaporising and burning intermediate layer 8 to disappear.

What we claim is:

1. A method for applying a smooth thin layer of organic solid coating material on to a layer of luminescent material having interstices therein, said layer of luminescent material being supported by the inner end wall of a cathode-ray tube envelope which comprises the step of filling the interstices in the luminescent material with a heat volatilizable liquid having a boiling point below the destructive temperature of said organic material in an amount just sufficient to fill the interstices to the highest surface level of the luminescent material whereby the level of the liquid is flush with the luminescent material thereby forming a smooth level surface for the application of a surface layer of a coating material insoluble in the liquid thereover, said liquid being inert to said luminescent material and to said surface layer, applying a solution of an organic coating material in a solvent immiscible with said liquid in said interstices over the luminescent material, evaporating the solvent to form a smooth thin layer of the coating material in contact with only the highest surface portions of the luminescent material, and thereafter volatilizing the liquid to remove the same from the interstices of the luminescent material.

2. A method for applying a smooth thin layer of organic solid coating material on to a layer of luminescent material having interstices therein, said layer of luminescent material being supported by the inner end wall of a cathode-ray tube envelope which comprises the steps of filling the interstices in the luminescent material with water in an amount just sufficient to fill the interstices to the highest surface level of the luminescent material and thereby forms a smooth level surface for the application of a surface layer thereover, applying a solution of nitrocellulose in a solvent immiscible with water over the luminescent material, evaporating the solvent to form a smooth thin layer of the nitrocellulose in contact with the highest surface portions of the luminescent material, and thereafter volatilizing the water to remove the same from the interstices of the luminescent material.

3. A method for applying a smooth thin layer of organic solid material on to a layer of luminescent material having interstices therein, said layer of luminescent material being supported by the inner end wall of a cathode-ray tube envelope which comprises the steps of filling the interstices with alcohol in an amount just sufficient to fill the interstices to the highest surface level of the luminescent material and thereby form a smooth level surface for the application of a surface layer thereover, applying a solution of nitrocellulose in ethyl acetate over the substratum, evaporating the ethyl acetate to form a thin smooth layer of the nitrocellulose in contact with the highest surface portions of the luminescent material, and thereafter volatilizing the alcohol to remove the same from the interstices of the luminescent material.

4. A method for applying a thin smooth layer of organic solid coating material on a layer of luminescent material having interstices therein, said layer of luminescent material being supported by the inner end wall of a cathode-ray tube which comprises the steps of filling the interstices with benzene in an amount just sufficient to fill the interstices to the highest surface level of the luminescent material and thereby form a smooth level surface for the application of surface layer thereover, applying a solution of nitrocellulose in butyl acetate over the luminescent material, evaporating the butyl acetate to form a smooth thin layer of nitrocellulose in contact with the highest surface portions of the luminescent material, and thereafter volatilizing the benzene to remove the same from the interstices of the luminescent material.

JOHANNES DE GIER.
JAN PEPER.

References Cited in the file of this patent

UNITED STATES PATENTS

| Number | Name | Date |
|---|---|---|
| 369,267 | Thompson | Aug. 30, 1887 |
| 618,672 | Henry | Jan. 31, 1899 |
| 1,690,427 | Oliver | Nov. 6, 1928 |
| 2,241,215 | Myers | May 6, 1941 |
| 2,373,849 | Palmer | Apr. 17, 1945 |
| 2,374,310 | Schaefer | Apr. 24, 1945 |
| 2,375,669 | McKinney | May 8, 1945 |